Jan. 24, 1939.  R. FLAGG  2,145,168
METHOD OF MAKING PIPE JOINT CONNECTIONS
Filed Oct. 21, 1935
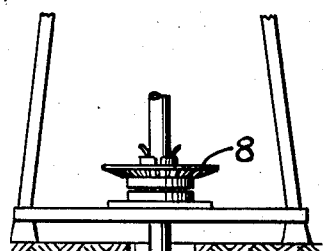
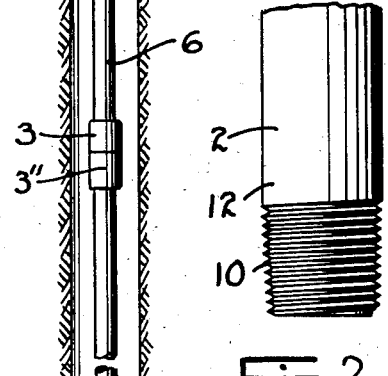
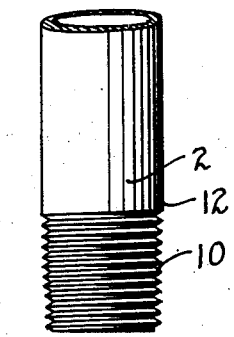
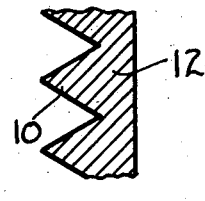
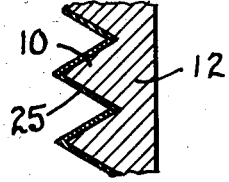
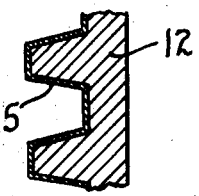
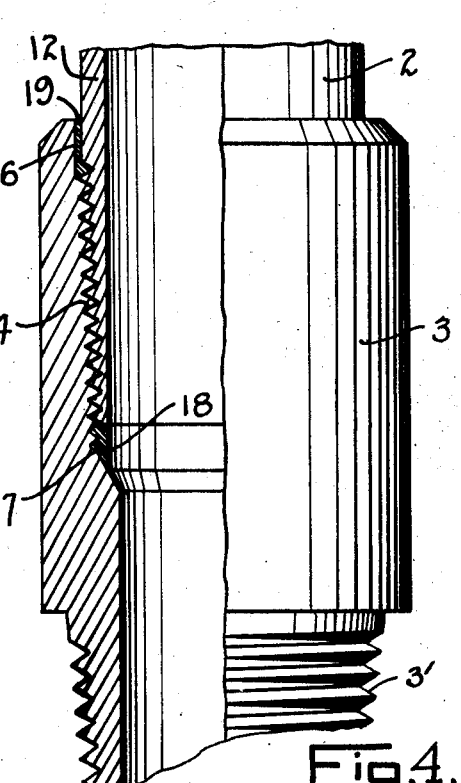
Inventor
RAY FLAGG
Jesse R. Stone
& Lester B. Clark
Attorneys.

Patented Jan. 24, 1939

2,145,168

UNITED STATES PATENT OFFICE 2,145,168

METHOD OF MAKING PIPE JOINT CONNECTIONS

Ray Flagg, Houston, Tex.

Application October 21, 1935, Serial No. 45,978

3 Claims. (Cl. 113—112)

The invention relates to an improvement in pipe connections, and particularly those types of joints where the pipe is to be connected to an adjoining pipe permanently or is to be connected to a coupling in a permanent manner where it is essential that the connection will be locked so that it will not become loosened and will at the same time maintain an absolute seal to prevent leakage.

It is one of the objects of the invention to provide a pipe joint connection wherein the threaded cooperating faces are sealed by a surfacing of softer metal to maintain a seal.

Another object of the invention is to coat the interengaging threaded faces of pipe sections with a brazing metal so that the pipes may be connected when such metal is in a molten condition so that it will solidify to lock the joint.

Still another object of the invention is to coat the threads of a pipe joint with a metal of low melting point.

Still another object of the invention is to provide a drill stem and tool joint connection so that the drill stem may be permanently fixed to the tool joint member without the aid of welding or heating the metal making up the pipe and tool joint to a temperature above the draw point.

Other and further objects of the invention will be readily apparent when the following description is considered in connection with the accompanying drawing wherein:

Fig. 1 shows a string of drill pipe located in the well bore in drilling position to illustrate the arrangement of the drill stem and tool joints while they are in use.

Fig. 2 shows the threaded end of one of the drill pipe sections as it is completed ready to be connected to the tool joint.

Fig. 3 shows the end of the drill joint of Fig. 2 after it has been heated and in position to be dipped in a vessel of coating metal in order to provide a seal and lock for the joint.

Fig. 4 is an elevation showing the pipe connection in section with the interengaging threads locked in position with the coating material.

Fig. 5 shows a standard V-thread which has been coated with a low melting point metal.

Fig. 6 shows the threads of Fig. 5 after it has been dipped in a brazing metal and ready for insertion in the box member of the next part to which it is to be connected.

Fig. 7 is a view of an Acme type thread which has been treated the same as the V-thread of Fig. 6.

The invention has been illustrated particularly in connection with a drill pipe section illustrated at 2 and a tool joint coupling 3, because this is one specific application of where a connection of this type may be used to advantage. It is to be distinctly understood, however, that any desired pipe connection may be treated in accordance with the invention in order to obtain a leak-proof joint which will be securely locked.

The invention is of particular application to drill stem connections because of the fact that the sections such as 4, 5, and 6 in the drill stem of Fig. 1 are successively connected together as the drill bit 7 is lowered into a well bore. The connections of the drill pipe sections are accomplished by means of couplings which are known as tool joints. A tool joint pin member is seen in Fig. 4 wherein the coarse thread 3' is provided on the lower end thereof and this coarse thread 3' is arranged to be received in the other half of the tool joint member 3" which will be fixed to the drill pipe 5 in the same manner that the tool joint portion 3 is fixed to the pipe 2 as will be later described.

When the pipes are connected and disconnected it is the intention of this invention to fix the tool joint or coupling member permanently to the pipe and the invention is not applied to the threads 3' which are to be released whenever the pipes are disconnected.

The bit is, of course, rotated by the drill stem through the medium of the rotary table 8. This table rotates and carries the drill stem gripped therein so that an enormous torque is applied to the pipe joints and connections. In some instances where the bit 7 engages a boulder or crevice the rotary table 8 continues to turn until the drill stem is wound up a considerable number of revolutions. Under these circumstances sometimes the bit 7 will become loosened and the spring in the drill stem tends to spin the bit so that some of the joints will tend to become unscrewed. It is desirable, therefore, to have the connections locked as much as possible to the pipe sections to prevent unscrewing.

In view of the enormous torque applied to the pipe also it causes the threads to gall and thereafter leak. In order to make a rigid connection between the drill stem and tool joint a practice has arisen of placing a bead of welding material about the top of the tool joint and about the drill stem after it has been screwed into the tool joint end to melt down the top edge of the tool joint and the surface of the pipe to form a bond. While this practice obtains a solid connection it is understood to be generally detrimental because of the tendency to crystallize the pipe material directly above the tool joint where any lateral strains must also be absorbed. The whipping action of the drill stem is tremendous and experience shows that of the drill stems which break, a majority of the breaks occur directly above or below a tool joint connection. The welding operation just explained is therefore particularly detrimental because it occurs at the point of the drill stem where the greatest stresses are applied.

In order to obtain a leak-proof locked connection the present invention contemplates that a pipe end such as 2 will be threaded at 10 with any desired type of thread. Figs. 5 and 6 show a V-thread whereas Fig. 7 shows an Acme thread, but it is intended that any type of thread may be employed. It will be understood that pipe of this general type is of a very high quality steel and is properly tempered so as to withstand the vibration and torque applied to the pipe during the drilling operation.

After the threads 10 have been cut on the pipe 2 either the entire pipe or the end 12 thereof is heated to a temperature slightly below the point to which the metal could be drawn, which is generally understood to be a temperature at which the metal will not lose its temper but is still capable of being changed in shape. The box member which is to receive the threaded portion 10 is seen in Fig. 4 and has the threaded portions 14 therein. This box member will be suitably heated to the same temperature as the end 12 of the pipe 2. While the box member 3 has been described, this may be the box end of an adjacent piece of pipe to which the pipe 2 is to be permanently connected, or it may be any suitable coupling, tool joint member, or other pipe which is to receive the pipe 2. When the pin and the box member are both heated to the desired temperature and coated with a low melting metal, preferably of a type which melts at a temperature lower than that to which the pipe end has been heated, such metal will remain liquid on the pipe ends. One such metal is ordinary solder or tin, and this operation may generally be designated as a tinning operation where the threads of both the pin and the box are washed with a thin coating of solder or other similar metal.

In view of the fact that the pipe is hot the coating metal does not immediately solidify, and if it is determined that a single coating or tinning is sufficient to form a seal and lock the pipes together the two pieces may be threaded into connection as seen in Fig. 4 and made up tightly so that as the pipe cools the coating metal will solidify and form a complete seal between the adjacent threads 10 and 14 and also fills any cavity as 16 adjacent the end of the box member and the cavity 17 adjacent the end of the pin member.

As the pipe cools and the coating metal begins to solidify the inside and outside of the joint may be wiped smooth as at 18 and 19 if desired, so that a neat appearance is obtained and no obstacles will be present on the inside of the pipe, to cause turbulence of the flowing fluid.

A vessel 20 in Fig. 3 contains a body of molten coating metal 21 and is merely illustrative of how the pipe 2 may have the threads 10 thereof dipped into the molten metal.

In some instances where an absolutely secure joint is required which will withstand enormous strains and stresses, an additional operation may be carried on after the first wash coating of tin has been applied. Fig. 6 shows a thread which has been treated with this additional step and illustrates a coating 25 of brazing spelter which has been applied over the first tin coating. This spelter melts at a slightly higher temperature than the tin and presents a brazing surface which will form a much better seal and tighter lock than will the tinned surface. Fig. 4 can be used to illustrate a joint which has been made up in this manner with the areas 16 and 17 filled with the brazing material which has been wiped smooth as at 18 and 19. The temperature of the pipe will be such that the brazing material will remain in molten condition as the threaded connection is made up and will solidify as the pipe cools.

This construction is of advantage because the temper of the pipe ends is not affected because they have not been heated above their drawing temperature. The material has not been affected or crystallized in any way and the pipe joint is permanently fastened together with the softer metal completely filling the area between the threads of the interengaging pipes so that a complete seal is obtained.

While the invention has been shown and disclosed as applied to a drill stem connection it is to be distinctly understood that it may be applied to any of the pipe connections desired, and while solder and brazing spelter have been specifically identified other suitable metals may be employed. Where the present invention is to be applied the machine work on the threads need not be as accurate as otherwise because the coating metal will eliminate slight inequalities and increase the bearing area so that a cheaper construction may be obtained.

What is claimed is:

1. A method of treating threaded pipe connections to obtain a leak-proof locked connection including the steps of heating the threads and adjacent portions of the pipe members to be connected, coating the areas to be joined with a bonding metal which remains molten by virtue of the temperature of the members, applying a coating of a second bonding metal over the first coating, and threading the pipes together in connected relationship with the bonding metal molten while the members are threaded into one another so that as the pipe cools the coatings will solidify to provide a leak-proof joint which is locked by the solidified coatings.

2. A method of treating threaded pipe connections to obtain a leak-proof locked connection including the steps of heating the threads and adjacent portions of the pipe members to be connected, coating the areas to be joined with a bonding metal which remains molten by virtue of the temperature of the members, applying a coating of a second bonding metal over the first coating, threading the pipes together in connected relationship with the bonding metal molten while the members are threaded into one another so that as the pipe cools the coatings will solidify to provide a leak-proof joint which is locked by the solidified coatings, and wiping the excess metal from the joint to provide smooth surfaces.

3. The method of producing a leakproof drill pipe to a tool joint connection which comprises heating a threaded portion of the parts to be connected, coating said heated portion of the parts to be connected with a molten bonding metal and assembling the parts together while so heated to a temperature at which the bonding metal remains molten whereby solidification of the coatings upon cooling will provide a leakproof locked joint.

RAY FLAGG.